United States Patent [19]

Hubbs

[11] Patent Number: 5,073,005
[45] Date of Patent: Dec. 17, 1991

[54] RETRO-REFLECTIVE PHOTOGRAMMETRIC TARGET

[75] Inventor: William O. Hubbs, Cedar Hill, Mo.
[73] Assignee: Hubbs Machine & Manufacturing, Cedar Hill, Mo.
[21] Appl. No.: 188,842
[22] Filed: May 2, 1988
[51] Int. Cl.$^5$ .................. G02B 5/12; G01C 15/02
[52] U.S. Cl. ........................... 359/515; 33/293
[58] Field of Search ............... 350/96, 103, 104, 105, 350/106, 107, 109, 319; 356/21, 372, 373, 375, 247; 33/293, 700, 707

[56] References Cited

U.S. PATENT DOCUMENTS

| | | | |
|---|---|---|---|
| 1,732,822 | 10/1929 | Wehr et al. | 350/109 |
| 1,959,090 | 5/1934 | Wood | 350/106 |
| 2,016,333 | 10/1935 | Leeds | 350/109 |
| 3,017,713 | 1/1962 | Butler | 350/97 |
| 4,340,273 | 7/1982 | Jack et al. | 350/105 |

Primary Examiner—Rodney B. Bovernick
Assistant Examiner—Ronald M. Kachmarik
Attorney, Agent, or Firm—Kalish & Gilster

[57] ABSTRACT

A target for use in photogrammetry and automated theodolite systems comprising a rigid body having a support surface, a retro-reflective member comprised of a tape-forming substrate having normally a rearward surface and a forward surface an adhesive provided on the rear surface thereof for securing same to the support surface of the target; there being light reflective discrete particles secured adhesively on the forward face of the retro-reflective member; and a mask-forming member having a rearward surface and a forwrd surface, the mask forming member being of greater area than that of the retro-reflective tape and the light reflective means provided thereon. The mask is secured in overlying in relationship upon the light reflective particles and provided with an opening with predetermined area less than that of the light reflective particles so that a predetermined portion of the latter is exposed therethrough.

8 Claims, 1 Drawing Sheet

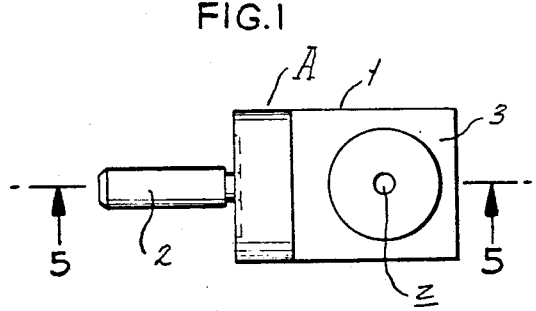
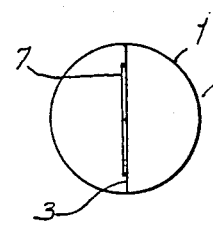
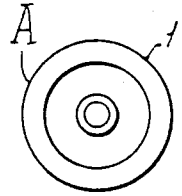
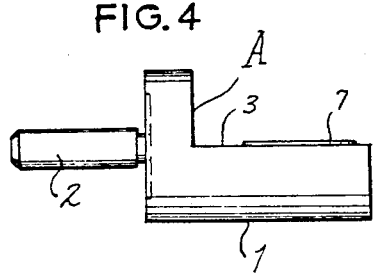
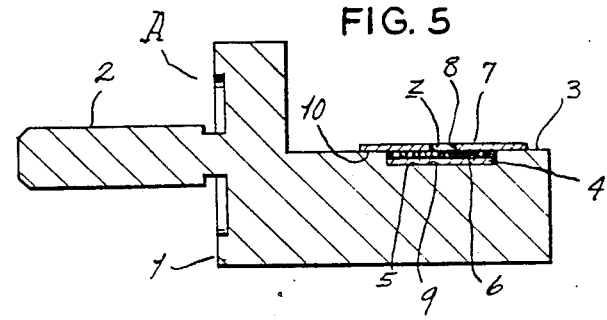
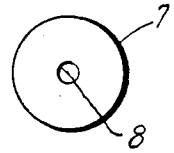
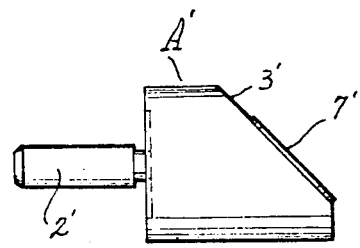
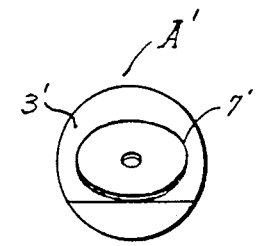
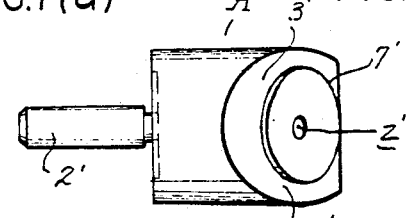
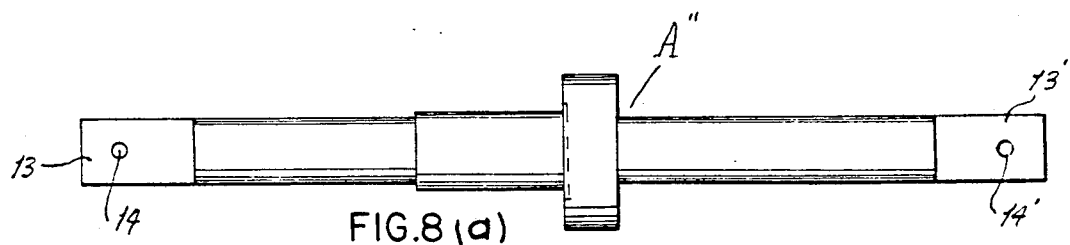
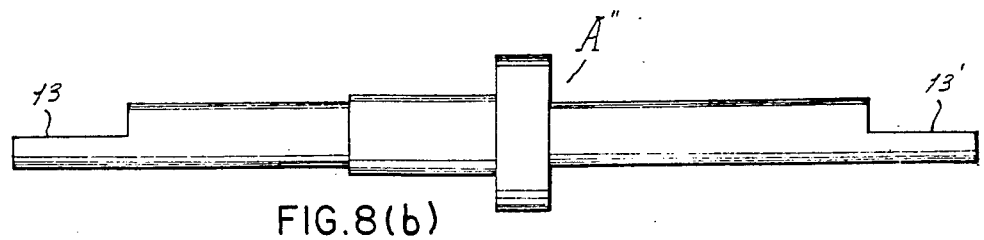

RETRO-REFLECTIVE PHOTOGRAMMETRIC TARGET

FIELD OF THE INVENTION

This invention relates in general to photogrammetry, as well as automated theodolite, systems and, more particularly, to certain improvements in targets for use therewith.

DESCRIPTION AND BACKGROUND OF THE PRIOR ART

There has been developed the widespread practice of utilizing photogrammetry, as well as automated theodolites, for a measurement tool for determining specific locations upon numerous industrial devices and industrial equipment; such as, among others tooling utilized in the construction of industrial products and articles with special reference to aircraft and automobiles, as well as components thereof. Light reflective targets are positioned at predetermined locations upon the specialized tooling in accordance with a pre-arranged pattern so that the precise relationship of the preselected locations therefor may be measured and/or verified. The periodic photogrammetric reproduction of the target pattern permits of facile reference to the original preselected target inter-relationship to assure of appropriate quality thereby allowing of elimination of any deformation or deflection that may have occurred through usage. The utilization of photogrammetry is appropriate for frequent inspection obviating the time-consuming, costly inspection by gauging which necessarily requires a master gauge for direct physical application involving the utilization of skillfully trained individuals. Thus, any divergence from the essential target relationship may be promptly effected with tool down-time minimized or eliminated and cost effectiveness greatly enhanced.

The targets utilized heretofore have consistently mounted, as often within a shallow recess, a light reflective tape* which constitutes a substrate upon the exposed face on which is adhered by a suitable glutinous material an assembly of light reflective granules, such as glass beads, which may have a diameter as in the order of 0.003 inches; being generally referred to as target dots. The opposite face of the tape is coated with a suitable adhesive, as in a layer in the range of 0.001 inches in thickness within the shallow recess formed in the target body. Such target thus constitutes what might be referred to as engineering points on the tooling, but, in addition thereto, have a wide range of uses for measuring, verifying, checking, and surveying intervening distances or inter-relationships between the target distances which may be in feet, inches, thousandths of an inch.

*Retro-reflective tape of this type is produced by 3M Company.

However, with targets of the type heretofore utilized there have been recognized certain serious problems. One of such has been caused by a certain instability due to the adhesive on the rear side of the substrate and also due to the relatively small size of the "dot", as a result of the inherent nature of the customary adhesive utilized upon the tape substrate. The critical location of the generally dot-forming granules is manifestly readily disturbed through inadvertent movement of the tape which may be caused by accidental forces impacting thereon.

Another problem results from the constitution of the retro-reflective material, that is, the granules, which are similar in general physical configuration to the discrete particles of sand as found upon sand paper, being coarse and uneven, so that a sharp, distinct, crisp edge on the granule or bead-like target portion is consistently attained. Such beads, which are adhesively secured to the tape substrate and being customarily of glass, may be severed rather easily, crushed, inadvertently removed, etc., when the retro-reflective tape is cut during the manufacturing process, all resulting in a jagged, irregular edge so that sharp deformation of the light-reflective "dot" or zone is denied. It will be appreciated that when one is concerned with the precise measurements sought by photogrammetry these aforesaid problems are indeed serious since the least displacement or inaccuracy in positioning, as well as irregularities in the edges of the light reflective beads zone cause a very grave effect when utilizing the photogrammetric reproduction for verifying or measuring purposes. Furthermore, such problems severely diminish the accuracy of the determinations of the bead light reflective "dot" or zone with consequent commensurate inaccuracies in the measurement.

SUMMARY OF THE INVENTION

Therefore, it is an object of the present invention to provide a new and useful improvement in a target for use in photogrammetry and automated theodolite which conduces to consistent accuracy in measurement, being resistant to inadvertent displacement as well as providing reliable consistency in measurement.

It is another object of the present invention to provide a target of the character stated which embodies a novel component for promoting sharp definition of the retro-reflective zone and which may be readily used with current retro-reflective targets.

It is still another object of the present invention to provide a target of the character stated which comprises a component which may be economically formed from a multiplicity of materials such as metal, plastics, and the like, without diminution in effectiveness and which may be readily secured in operative position with respect to the light reflective granules without the use of specialized equipment or highly developed skills on the part of the artisan.

It is another object of the present invention to provide a target of the character stated comprising a novel element for controlling the area of the light reflective "dot" or zone so that extreme selectivity is accorded to assure of such zones being commensurate with the particular application.

It is another object of the present invention to provide a target of the character stated embodying an element for appropriately preselectedly controlling the masking the light reflective zone which may be most economically produced; which is extremely reliable and durable in usage being resistant to accidental displacement so as to assure integrity of the dimensions of the light reflective zone and which may be utilized in a simple, facile manner.

BRIEF DESCRIPTION OF THE DRAWINGS

FIG. 1 is a front view of a target provided with a retro-reflective area delineated by a masking member constructed in accordance with and embodying the present invention.

FIG. 2 is an end view of the target shown in FIG. 1.

FIG. 3 is an end view of the target carrying the shank.

FIG. 4 is a side view of the target illustrated in FIG. 1.

FIG. 5 is a vertical transverse sectional view taken on line 5—5 of FIG. 1.

FIG. 6 is a plan view of a masking member constructed in accordance with and embodying the present invention.

FIG. 7(a) is a side view of a target having a support surface at a 45° angle to the shank and equipped with a mask for limiting the retro-reflective zone; said mask being constructed in accordance with and embodying the present invention.

FIG. 7(b) is an end view of the target illustrated in FIG. 7(a).

FIG. 7(c) is a top plan view of the target illustrated in FIG. 7(a).

FIG. 8(a) is a top plan view of another form of target provided with a pair of spaced apart retro-reflective zones provided with delimiting masks constructed in accordance with and embodying the present invention.

FIG. 8(b) is a side view of the target shown in FIG. 8(a).

DESCRIPTION OF THE PREFERRED EMBODIMENT

Referring now by reference characters to the drawings which illustrate the preferred embodiment of the present invention, A designates, generally, a target as of the type utilized in photogrammetry and automated theodolite having a body 1 formed generally of steel and being treated with a black oxide finish. The configuration and design of which is determined by the particular application, so that the same may be readily mounted on, and dismounted from, cooperating blocks disposed on the tooling device or other instrumentality to be subjected to the photogrammetric procedure. Bodies 1 customarily comprise at one end an elongated shank or stem 2 having a predetermined outside diameter for ready reception within a bore formed in the block or other mounting receptacle. Additionally, such body is provided with a flat support surface 3 at a preselected angle to the shank as determined by the intended reproduction angle. It is to be understood that the particular design and construction of target body A does not form a part of the present invention but is merely exemplary of conventionally used targets in photogrammetry and automated theodolite systems.

Provided upon support surface 3 is a section of retro-reflective tape 4 the under or inner surface of which is coated with a suitable adhesive, as at 5, which may have a thickness of 0.001 inches; and the opposite or outer surface of which is provided with a layer of discrete granules 6, such as glass beads, which are retro-reflective; the same being relatively coarse being comparable to sand particles found on sand paper in physical form and with the edges of the granules being, understandably, relatively rough and uneven. It is thereby understood that the provision of such tape 4 together with the associated granules is well known in the art and thus does not form a part of the present invention; said granules adhering to tape 4 by a suitable adhesive.

Disposed for controlling the area of the granules on the retro-reflective tape 4 to be exposed for photogrammetry is a mask member 7 (See FIG. 6) having an area greater than that of the retro-reflective tape 4 so as to project beyond the margins thereof when in overlying relationship thereon. The area of light reflective granules 6 which may be co-terminal with the tape substrate 4, are arranged in a circular pattern of predetermined diameter which heretofore has been difficult to attain accurately. As may be best seen at FIG. 5, the relatively increased cross-section of mask 7 covers tape 4 with the related granules 6 so that the latter are captured stably therebeneath and restrained against inadvertent displacement thereby. Mask 7 is provided with, preferably centrally, an aperture or opening 8 of predetermined dimension or diameter consonant with that portion of the retro-reflective material, that is the granules 6, to be exposed for photogrammetry. Thus, with particular reference being made to FIG. 5, it will be seen that opening 8 is of relatively limited diameter so that only a relatively small portion of the granules 6 will be exposed which constitute the retro-reflective zone or so-called "dot" for photogrammetric purposes. Accordingly, the extent of aperture 8 controls with precision of the area of the actual light target, so that one is relieved of the need to create a light-reflective zone from distribution of the granules only. Therefore, by use of mask 7, the extreme concern and care laboriously exercised in creating a granule zone of preselected dimension and configuration is entirely obviated.

Support surface 3 may be provided with a depression or recess 9 of such extent and depth as to snugly accept tape 4 and the retro-reflective material 6 carried thereon whereby the upper surface of the latter would be flush with said support surface 3. Mask 7 is then applied directly upon the support surface 3 overlying material 6 and is adhered thereto by a commensurate glutinous coating provided on the undersurface thereof, as at 10, for assuring of steadfast positioning.

Thus, by utilization of mask 7 the light reflective zone, as indicated at z, is controlled both as to the area as well as to the configuration with the same being amenable to a tolerance of but ±0.0005 inches on location of the light reflective zone. In the industry the exposed zone z is often referred to as the retro-reflective "dot" since normally it will have a dot like appearance.

Mask 7 may be formed of any suitable, durable material, such as a thermoplastic being preferably a polyester, such as Mylar*, but may also be made of metal, such as steel, brass, etc., and having a thickness as in the order of 0.003 inches. The adhesive provided on the undersurface of mask 7 may be of any suitable type, such as, for instance, an epoxy.

*Mylar is a registered trademark of DuPont de Nemours E. I. & Co.

The selected area of retro-reflective zone z is determined by the distance between target A and the photogrammetric equipment; manifestly the greater the distance the greater the area of said zone z. It will thus be seen that with the edges of opening 8 being sharply delineated an equally sharp definition of the edges of the retro-reflective zone z will be achieved, causing a desired crisp, distinctness and thereby avoiding the usual rough or jagged edges as are consistently encountered with the current unmasked granule zones. By such distinctive edging the retro-reflective zone z thus would produce a fully dimensionally reliable indicator thereby overcoming one of the serious problems which has to the present time provided a source of continuing difficulty in photogrammetry and the like.

Furthermore, as pointed out, the area of mask 7 is greater than that of the retro-reflective material so that the extending edge portions, effecting engagement with surface 3 of target body 1 assures of stability of the retro-reflective zone z with consistent resistance to any inadvertent displacement. This feature thereby successfully solves another problem which has been inherent with current structures and that was the tendency for the reflective substrate-forming tape to be movable under relatively lightly applied forces with the resultant displacement of the reflective material 6 bringing about an inaccuracy in the overall relationship of the targets as revealed through the photogrammetric effort. Thus, any such inadvertent shifting could cause severe errors in spacial relationships of the tooling or other devices involved with readily appreciated disastrous results.

Turning now to FIGS. 7(a), (b), and (c), A' identifies a target which might be referred to as of the 45° angle type, that is wherein the flat surface 3' is at an angle of 45° to the long axis of the associated shank 2'. Mounted on surface 3' may be the same assemblage of retro-reflective tape 4' (not shown), retro-reflective material 6', and mask 7' to provide a retro-reflective zone z'. The angulation of surface 3' is dictated entirely by the photogrammetric requirements of the particular object, and thus may be disposed at any predetermined angle to the shank axis.

FIGS. 8(a) and (b) show another form of target body A" which is of elongated nature so as to provide a pair of support surfaces, as at 13, 13', which are illustrated to be located at opposite ends of said target body A". In accordance with the embodiments above discussed, support surfaces 13, 13' each have thereon retro-reflective zone 14, 14', respectively, which constitutionally correspond to the above described zone z, z'. Thus, target body A" merely demonstrates the infinite potential for target configurations to meet the needs of any particular tool, instrumentality, device, equipment or the like to be made subject to a photogrammetric system or an automated theodolite system wherein the mask 7 of the present invention may be employed.

Turning once again to FIG. 5, it will be seen that the retro-reflective tape 4 and the retro-reflective material 6 carried thereon are disposed within a depression or recess 5 provided within the related support surface 3. It should be understood that the provision of such a depression is not critical to this invention, as the tape 4 with the granules 6 carried thereon and the overlying mask 7 may be applied directly upon the support surface 3. However, the provision of recess 5 assures that the retro-reflective zone z will be flush with the related support surface and thereby conduce to maximum stability and resistance to accidental damage to the mask and retro-reflective zone.

What is claimed is:

1. A target for use in photogrammetry and automated theodolite systems comprising a rigid body having a flat support surface, a retro-reflective tape being of relatively thin tape-like character having a normally rearward surface and forward surface, adhesive means provided on the rearward surface of said retro-reflective tape for securing said retro-reflective tape to said support surface, light reflective means provided on the forward surface of said tape, and a mask having a rearward surface and forward surface, adhesive means provided on the rearward surface of said mask for securing said mask in overlying relationship to said light reflective means, said mask having an opening of predetermined area less than the area of the light reflective means and a cross section being greater than that of the retro-reflective tape and the light reflective means provided thereon so as to enclose the latter when the mask is in operative position.

2. A target as defined in claim 1 and further characterized by said light reflective means being formed of discrete amorphous granules.

3. A target as defined in claim 2 wherein the light reflective granules are glass beads.

4. A target as defined in claim 1 wherein the mask is formed from a class consisting of metal and thermoplastic.

5. A target as defined in claim 4 wherein the mask of disk shape and the opening is of circular form.

6. A target as defined in claim 5 wherein the mask is of greater area than that of the light reflective means and the retro-reflective tape.

7. A target as defined in claim 1 wherein the mask is formed of Mylar ®.

8. A target for use in photogrammetry and automated theodolite systems comprising a rigid body having a flat support surface with a recess portion, a retro-reflective tape being of relatively thin tape-like character having a normally rearward surface and forward surface disposed within said recess portion, adhesive means provided on the rearward surface of said retro-reflective tape for securing said retro-reflective tape to said support surface, light reflective means disposed within said recess portion and provided to the forward surface of said tape, and a mask having a rearward surface and forward surface, adhesive means provided on the rearward surface of said mask for securing said mask in overlying relationship to said light reflective means, said mask having an opening of predetermined area less than the area of the light reflective means and a cross section being greater than that of the retro-reflective tape and the light reflective means provided thereon so as to enclose the latter when the mask is in operative position.

* * * * *